(12) United States Patent
Bouffard et al.

(10) Patent No.: US 7,195,839 B2
(45) Date of Patent: Mar. 27, 2007

(54) BATTERY CELL WITH IMPROVED PRESSURE RELIEF VENT

(75) Inventors: Richard L. Bouffard, Litchfield, CT (US); Peter M. Lewis, Avon Lake, OH (US); Huaxin Li, Rochester Hills, MI (US); Paul R. Elsdon, Jr., Wolcott, CT (US); Richard J. Sosnovich, Jr., Beacon Falls, CT (US); Warren Emerson Sweet, Naugatuck, CT (US); Robert E. Ray, Jr., Strongsville, OH (US); James X. Wu, North Olmsted, OH (US)

(73) Assignee: Eveready Battery Company, Inc., St. Louis, MI (US)

( * ) Notice: Subject to any disclaimer, the term of this patent is extended or adjusted under 35 U.S.C. 154(b) by 514 days.

(21) Appl. No.: 10/365,197

(22) Filed: Feb. 11, 2003

(65) Prior Publication Data

US 2004/0157115 A1    Aug. 12, 2004

(51) Int. Cl.
H01M 2/12 (2006.01)
H01M 2/02 (2006.01)
B65D 51/16 (2006.01)

(52) U.S. Cl. .......................... 429/56; 429/82; 429/176; 220/367.1

(58) Field of Classification Search .................. 429/56, 429/82, 176
See application file for complete search history.

(56) References Cited

U.S. PATENT DOCUMENTS

| 3,074,602 A | 1/1963 | Shillady et al. | |
| 3,831,822 A | 8/1974 | Zundel | 222/397 |
| 3,918,610 A | 11/1975 | Willis | 222/397 |
| 4,010,044 A | 3/1977 | Schaumburg | 429/82 |
| 4,175,166 A | 11/1979 | Rosansky | 429/56 |
| 4,256,812 A | 3/1981 | Tamura et al. | 429/56 |
| 4,484,691 A | 11/1984 | Lees | 220/89 |
| 4,601,959 A | 7/1986 | Romero | 429/56 |
| 4,698,282 A | 10/1987 | Mantello | 429/56 |

(Continued)

FOREIGN PATENT DOCUMENTS

EP    1079454    2/2001

(Continued)

OTHER PUBLICATIONS

Oberg, E.; Jones, F.D.; Horton, H.L.; Ryffell, H.H.; Machinery's Handbook (26th edition); Aug. 21, 2001; Industrial Press; 407.*

*Primary Examiner*—Dah-Wei Yuan
*Assistant Examiner*—Karie O'Neill
(74) *Attorney, Agent, or Firm*—Russell H. Toye, Jr.

(57) ABSTRACT

An electrochemical cell with a pressure relief vent formed in a metal plate disposed in at least one of the closed end and the open end of the container. The pressure relief vent has an annular ring that includes a reduced thickness groove, interrupted in at least two places by unthinned sections of the plate. When the vent opens to relieve pressure from within the cell, the area of the plate within the annular ring remains attached to the remainder of the plate by at least one of the unthinned sections. A can with such a pressure relief vent formed in the can bottom is useful as an electrochemical cell container.

35 Claims, 4 Drawing Sheets

U.S. PATENT DOCUMENTS

| | | | | |
|---|---|---|---|---|
| 4,722,874 A * | 2/1988 | Marchak | | 429/56 |
| 4,789,608 A | 12/1988 | Oswald | | 429/56 |
| 4,803,136 A | 2/1989 | Bowsky et al. | | 429/56 |
| 4,842,965 A | 6/1989 | Urushiwara et al. | | 429/56 |
| 5,042,675 A | 8/1991 | Patterson | | 220/89.1 |
| 5,197,622 A | 3/1993 | Anderson | | 220/89.2 |
| 5,702,840 A | 12/1997 | Byon | | 429/89 |
| 5,741,606 A | 4/1998 | Mayer et al. | | 429/53 |
| 6,159,631 A | 12/2000 | Thompson et al. | | 429/82 |
| 6,265,101 B1 | 7/2001 | Tucholski | | 429/163 |
| 6,303,246 B1 | 10/2001 | Takada et al. | | 429/58 |
| 6,346,342 B1 * | 2/2002 | Li | | 429/56 |
| 6,348,281 B1 * | 2/2002 | Li | | 429/53 |
| 6,410,186 B1 | 6/2002 | Tucholski et al. | | 429/174 |

FOREIGN PATENT DOCUMENTS

| | | |
|---|---|---|
| JP | 1309253 | 12/1989 |
| JP | 02284348 | 11/1990 |
| JP | 03226964 | 10/1991 |
| JP | 04242069 | 8/1992 |
| JP | 9139197 | 5/1997 |
| JP | 9161738 | 6/1997 |
| JP | 10012209 | 1/1998 |
| JP | 10076338 | 3/1998 |
| JP | 10092397 | 4/1998 |
| JP | 11007929 | 1/1999 |
| JP | 11213978 | 8/1999 |
| JP | 11250886 | 9/1999 |
| JP | 01234296 | 8/2001 |
| JP | 01236929 | 8/2001 |

* cited by examiner

BATTERY CELL WITH IMPROVED PRESSURE RELIEF VENT

BACKGROUND

The present invention generally relates to an electrochemical battery cell. More particularly, the present invention relates to battery cells with improved pressure relief vents.

Increasing the discharge capacity of electrochemical cells is an ongoing objective of manufacturers of electrochemical cells and batteries. Often there are certain maximum external dimensions that place constraints on the volume of a given type of cell or battery. These maximum dimensions may be imposed through industry standards or by the amount of space available into which the cells or batteries can be put. These dimensions limit maximum cell and battery volumes. Only a portion of the volume is available for the materials (electrochemically active materials and electrolyte) necessary for the electrochemical discharge reactions, because other essential, but inert, components (e.g., containers, seals, terminals, current collectors, and separators) also take up volume. A certain amount of void volume may also be necessary inside the cells to accommodate reaction products and increases in material volumes due to other factors, such as high temperature. To maximize discharge capacity in a cell or battery with a limited volume, it is desirable to minimize the volumes of inert components.

Electrochemical cells are capable of generating gas, during storage, during normal operation, and, especially, under common abusive conditions, such as forced deep discharging and, for primary cells, charging. Cells are designed to release internal pressure in a controlled manner. A common approach is to provide a pressure relief mechanism, or vent, which releases gases from the cell when the internal pressure exceeds a predetermined level. Pressure relief vents often take up additional internal volume because clearance is generally needed between the vent and other cell or battery components in order to insure proper mechanical operation of the mechanism.

Dimensions of consumer cylindrical alkaline batteries are specified in an international standard (International Electrical Commission Publication 60086-2). Such cells have a positive electrode containing manganese dioxide, a negative electrode containing zinc, and an alkaline aqueous electrolyte typically containing potassium hydroxide. They often have a cylindrical steel can that serves as the cell container, with the positive electrode (cathode) formed in a hollow cylindrical shape against the interior surface of the can. A gelled negative electrode (anode) is centrally disposed within the cylindrical cavity in the cathode. An ion-permeable, electrically insulating separator is placed between the anode and adjacent surfaces of both the cathode and the bottom of the can. Electrolyte solution is contained within both the anode and the cathode. The can, which is in direct contact with the cathode, serves as the cathode current collector. The open top portion of the can is closed with a closing element, typically including an annular polymeric seal. An outer cover is generally placed over the seal to serve as a negative terminal for the cell. In addition to closing the can, the seal also electrically insulates the negative terminal from the can. An anode current collector, usually in the form of a brass nail or wire, extends through an aperture in the center of the seal and into the anode within the cell. The end of the anode current collector on the outside of the cell makes electrical contact with the negative terminal. The bottom of the can may be flat, or it may be formed to have a central protruding nubbin that serves as the positive terminal of the cell. If the can bottom is flat, a separate metal cover is normally affixed to the can bottom as the positive terminal. A jacket, often an electrically insulating, adhesive film label, is generally placed around the side walls of the can. Cells may include additional features. For example, an inner cover or a bushing may be disposed between the seal and the negative terminal to provide a rigid member for maintaining a compressive seal between the seal and the surface of the can and/or anode current collector. In such cells the seal also typically contains a pressure relief vent. This feature usually includes a thinned area, which is designed to rupture when the internal pressure goes above a predetermined level. Examples of cells with seal designs of this type can be found in U.S. Pat. Nos. 5,227,261 and 6,312,850. However, this type of seal requires a relatively large amount of volume in order for the pressure relief vent to function as intended.

In order to increase the amount of active materials in cylindrical alkaline cells, more volume efficient cell designs have been developed. In some of these, the pressure relief vent has been taken out of the seal and put into either a metal cover outside the seal or into the bottom of the can. Many different designs are possible for pressure relief vents formed in metal plates, whether covers or can bottoms, for electrochemical cells. Some of these include raised ridges or depressed troughs, projecting outward or inward, respectively, from the surface of the vent-containing plate. Examples of cells with such pressure relief vent designs can be found in U.S. Pat. Nos. 3,831,822; 3,918,610; 4,484,691; 4,601,959; 4,789,608; 5,042,675; and 5,197,622. Each of these references suffers from one or more disadvantages. For example, they may rely on deformation of the plate at the ridges/troughs to concentrate stress in a weakened portion of the plate for the vent to open. This may require a relatively large deflection in the surface of the plate, which is counterproductive when maximizing the internal volume of the cell for active materials is an objective. Such designs may also be relatively complicated and difficult to manufacture, which can make precise, reliable control of the pressure at which the vent opens difficult.

Other pressure relief designs do not have ridges or troughs. Some of these have grooves, or scores, of reduced thickness in the surface of the vent-containing plate. These grooves create weak spots in the plate that are designed to tear or rupture when the pressure differential between the two sides of the plate becomes too great. A variety of such grooves can be used. For example, the groove may be in the form of: a circle, a partial circle, one or more curved lines, one or more straight lines, or two or more intersecting straight and/or curved lines. The grooves may be formed in the plate in any of a number of possible ways, such as by stamping, coining, scoring, and etching. It may be possible to combine the step of forming the pressure relief vent for an electrochemical cell with the process of making the component in which it is formed. The grooves may be formed when a cover or a can is formed, for example by stamping and/or drawing, using punches and dies, such as in a multiple-stage progressive die set or transfer press tooling. One or more steps of such a process can be modified and/or added to include the formation of the vent grooves.

Information relevant to previous attempts to address the above problems by using a cell design with a grooved pressure relief vent in a metal cell cover or the bottom of the can may be found in U.S. Pat. Nos. 3,074,602; 4,010,044; 4,256,812; 4,698,282; 4,803,136; 4,842,965; 6,265,101; 6,303,246; 6,346,342; and 6,348,281. Additional examples may be found in Japanese unexamined patent publication numbers 01-309,253 A; 09-139,197 A; 10-092,397 A; 11-213,978 A; and 11-250,886 A. However, each of these references suffers from one or more of the disadvantages described below.

Some grooved vent designs are expensive because they are complex and require more expensive tooling. Some designs require tooling that is more difficult to maintain. Others add unnecessarily to the difficulty and cost of manufacturing because the designs are not symmetrical, placing more stresses on the equipment and tooling, and increasing the frequency and cost of maintenance and replacement. Other grooved vent designs may be unsuitable for use in an electrochemical cell because, when the vent operates, a portion of the vent-containing plate may be ejected from the cell. Yet other grooved vent designs require too much clearance for the vent to function, making less internal volume available for active materials, or do not open a large enough area to relieve the internal cell pressure quickly enough to avoid damage or injury.

For the foregoing reasons, there is a need for a high-capacity electrochemical battery cell having a reliable, low-volume, cost-effective pressure relief vent.

SUMMARY

One aspect of the invention is an electrochemical battery cell that has a reliable, low-volume, cost-effective pressure relief vent. The cell comprises a positive electrode, a negative electrode, and an electrolyte; a container comprising a side wall, an open end and a closed end, the closed end comprising a first metal plate; a closing element, comprising at least one member selected from the group consisting of a second metal plate and a seal, disposed in and closing the open end of the container; and a pressure relief vent, comprising at least one interrupted annular reduced thickness groove, formed in a vent-containing metal plate. The reduced thickness groove is interrupted in at least two places, each by an unthinned section of the vent-containing metal plate, to form at least two reduced thickness arcs. The vent is capable of opening at the groove, when an internal cell pressure exceeds a predetermined difference above an external pressure, such that an area of the vent-containing plate radially inside the groove remains attached to an area of the vent-containing plate radially outside the groove by one or more of the unthinned sections interrupting the groove. The vent-containing metal plate is at least one member of the group consisting of the first metal plate and the second metal plate.

In an embodiment of the invention, the cell comprises a positive electrode comprising manganese dioxide, a negative electrode comprising zinc, and an electrolyte comprising an alkaline aqueous solution; a container comprising a side wall, an open end and a closed end, the closed end comprising a first metal plate; a closing element, comprising at least one member selected from the group consisting of a second metal plate and a seal, disposed in and closing the open end of the container; and a pressure relief vent, comprising an annular ring formed in the first metal plate. The positive electrode is disposed adjacent to the side wall of the container, and the negative electrode is disposed in a cavity within the positive electrode. The annular ring comprises a reduced thickness groove that is interrupted in at least two places, each by an unthinned section of the first metal plate, to form at least two reduced thickness arcs. The vent is capable of opening at one or more of the arcs, when an internal cell pressure exceeds a predetermined difference above an external pressure, such that an area of the first metal plate radially inside the annular ring remains attached to an area of the first metal plate radially outside the annular ring by one or more of the unthinned sections interrupting the groove.

Another aspect of the invention is a metal can for use as an electrochemical battery cell container. The can comprises a side wall, an open end, and a closed end, the closed end comprising an integral metal plate. The metal plate comprises a first surface, a second surface, and an interrupted annular reduced thickness groove formed in at least one of the first and second surfaces. The reduced thickness groove is interrupted in at least two places, each by an unthinned section of the vent-containing metal plate, to form at least two reduced thickness arcs. The plate is capable of opening at one or more of the arcs, when exposed to a pressure differential between the first and second surfaces above a predetermined level, such that an area of the plate radially inside the groove remains attached to an area of the plate radially outside the groove by one or more of the unthinned sections interrupting the groove.

BRIEF DESCRIPTION OF THE DRAWINGS

These and other features, advantages and objects of the present invention will be further understood and appreciated by those skilled in the art by reference to the following specification, appended claims, and accompanying drawings, where:

DESCRIPTION

A battery cell according to the present invention comprises a pressure relief vent mechanism in a metal plate near either or both of the bottom or top of the cell. The plate or plates containing the pressure relief vent and the additional space required for the vent to properly open consume a small amount of the total cell volume, so the internal volume of the cell that may contain the electrochemically active materials can be maximized. The pressure relief vent is designed to be reliable, with a small variability in the pressure at which the vent will operate. It is also designed for ease and economy of manufacture.

Figure 1:
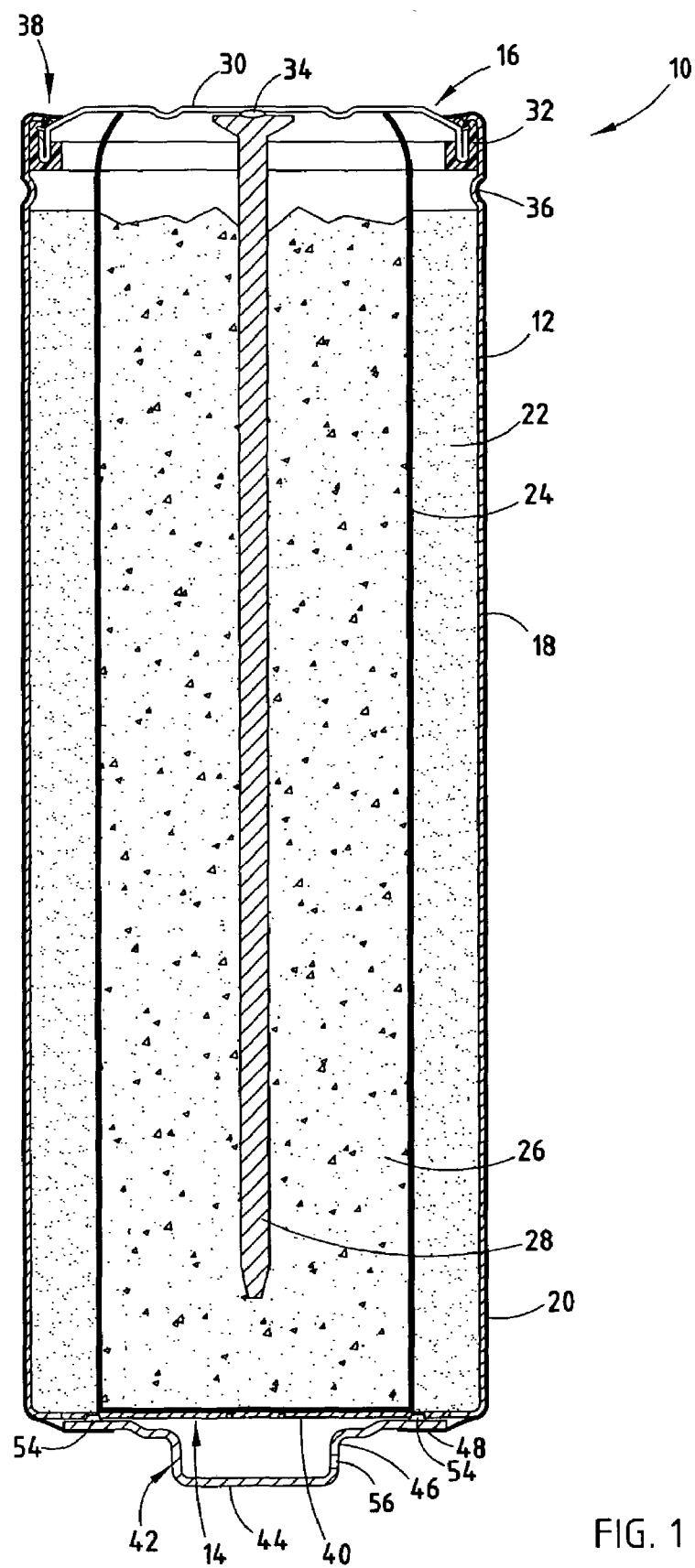
FIG. 1 is a full sectional view showing a cross-section of an embodiment of the battery cell of the invention.

An embodiment of a battery cell according to the present invention is shown in FIG. 1. The cell 10 in FIG. 1 is a cylindrical alkaline cell, but the invention may be adapted to other cell shapes and electrochemical systems. The cell 10 has a positive electrode (cathode) 22, comprising manganese dioxide as the active positive material and an electrically conductive material such as graphite, and a negative electrode (anode) 26, comprising zinc particles in a gelled aqueous electrolyte solution, in a container 12. An ionically conductive, electrically nonconductive separator 24 is disposed between the electrodes. The cathode 22 is formed in a hollow cylindrical shape against the inner surface of the side wall 18 of the container 12. The inner surface of the cathode 22 and the bottom 14 of the container 12 form a cavity, lined with the separator 24, within which the anode 26 is disposed.

The cell container 12 in FIG. 1 is a metal can with a metal plate forming a closed end (bottom) 14. The metal plate 14 may be an integral part of the container 12, such as in a drawn or extruded can, as shown in FIG. 1. Alternatively, the container may be a tube, such as an extruded tube or a seamed tube, with a metal plate affixed thereto.

The open end 16 of the container 12 is closed with a closing element 38. The closing element 38 comprises at least a seal 32, which may be in the form of a polymeric gasket or grommet, or a metal plate (not shown) that can cooperate with the container 12 to enclose the internal cell components and keep them sealed inside the cell 10. In the embodiment shown, the closing element 38 also comprises a negative contact terminal 30 disposed over the seal 32. In some embodiments, the negative contact terminal 30 may comprise the metal plate of the closing element 38. The closing element 38 may comprise one or more additional components, such as an anode current collector 28, a separate metal plate disposed between the negative terminal 30 and the seal 32, and a compression bushing (not shown). The compression bushing may be used to hold the seal 32 in compression against the anode current collector 28. The anode current collector 28 may be connected to the negative terminal 30 by a weld 34, or the negative terminal 30 may be biased against the anode current collector 28 to maintain electrical contact. The closing element may be supported by an annular bead 36 near the top of the side wall 18 of the container 12.

The cell 10 in FIG. 1 has a pressure relief vent 40 in the bottom 14 of the container 12 to release gas from the cell 10 in a controlled manner if the internal pressure increases above a predetermined level. Alternatively, a pressure relief vent may be formed in a metal plate in the closing element (e.g., in either a negative terminal or in a separate cover between the negative terminal and the seal), or a pressure relief vent may be formed in both the closed end of the can and in the closing element. The invention can also be used in combination with a conventional pressure relief vent in the seal, e.g., to provide a redundant vent.

The cell 10 has a positive contact terminal 42 disposed on the bottom 14 of the container 12, extending over the vent 40. The positive terminal 42 may be affixed with welds 54 or by other means that will keep the positive terminal 42 in physical and electrical contact with the bottom 14 of the container 12. The welds 54 are positioned on the peripheral flange 48 of the positive terminal 42, close to the upstanding wall 46 of the nubbin 44 to minimize any constraint by the positive terminal 42 on bulging of the bottom 14 of the container 12 when pressure builds up inside the cell 10. The positive terminal 42 has a protruding nubbin 44. The positive terminal 42 not only provides an electrical contact surface, but it also provides an attractive, corrosion resistant cover over the bottom 14 of the container 12 and protects the vent 40 from damage. The nubbin 44 provides an open space into which the vent 40 can open without interference from another cell or an external electrical contact. The positive terminal 42 also helps to contain internal cell components when the internal pressure is released through the open vent 40. One or more openings 56 may also be provided in positive terminal 42 to allow gas to escape.

The cell 10 may be used as a single cell battery or as a component cell in a multiple cell battery. When used as a single cell battery, a jacket 20, sometimes in the form of a heat-shrinkable adhesive label, is disposed around the side wall 18 of the container 12, with the distal edges of the jacket 20 generally extending over the edges of the container 12.

Figure 2:
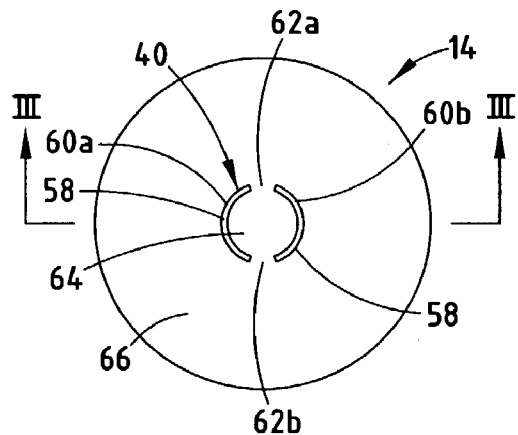
FIG. 2 is a plan view showing the outer surface of a variation of the bottom of the container of the cell of FIG. 1.
Figure 3:
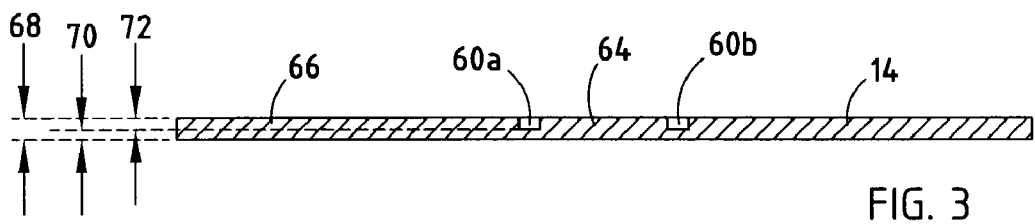
FIG. 3 is a partial sectional view showing a cross-section of the container bottom in FIG. 2 taken at III—III.

An embodiment of a pressure relief vent of a cell of the present invention is shown in FIG. 2, which is a plan view of the outer surface of the bottom 14 of the container 12 of the cell 10 of FIG. 1. The pressure relief vent 40 is an interrupted annular ring 58, in the form of a broken reduced thickness groove, formed in the metal plate 14 comprising the closed bottom end of the cell 10. The unthinned sections 62a and 62b interrupt the groove 58 to form two reduced thickness arcs 60a and 60b. Adjacent ends of the arcs 60a and 60b are separated from each other by unthinned sections 62a and 62b. Annular ring 58 defines an area inside the ring 64 and an area outside the ring 66. The arcs 60a and 60b may be formed in either surface of the metal plate 14, but forming them in the outer surface provides a smooth surface in contact with internal components of the cell 10. As shown in FIG. 3, which is a cross section of the container bottom 14 in FIG. 2 taken at III—III, the metal plate 14 has a thickness 68 beyond the reduced thickness arcs 60a and 60b. The arcs 60a and 60b each comprise a groove having a depth 72, each groove defining a thinned thickness 70 of metal plate 14 at the deepest part of the groove.

Figure 4:
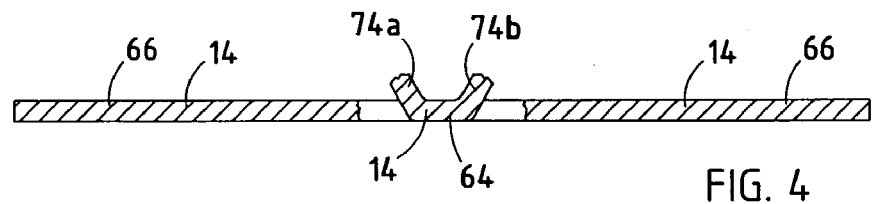
FIG. 4 is a partial sectional view of the container bottom in FIG. 3 after opening of a pressure relief vent.

The pressure relief vent 40 operates to release gas and/or liquid from inside the cell 10 when the internal pressure of the cell 10 exceeds a predetermined limit. The limit is selected such that the vent 40 will open before either the can 12 ruptures elsewhere or the negative terminal 30 or part of the closing element 38 is ejected from the cell 10. When the pressure limit is exceeded, the metal plate 14 tears or fractures at one or more of the reduced thickness arcs 60a and 60b. The pressure inside the cell 10 is reduced when gas or liquid escapes from the resultant opening(s) in the metal plate 14. The metal plate 14 in FIG. 3 is shown after the vent 40 opens in FIG. 4. Portions 74a and 74b of the area inside the annular ring 64 are deflected generally outward, away from the cell 10. The area inside the ring 64 remains attached to the area outside the ring 66 at one or both of the unthinned sections 62a and 62b, creating hinges at which the outward deflected portions 74a and 74b swing open. To prevent interference with the opening of the vent 40, there is sufficient clearance to the outside of the metal plate 14 for portions 74a and 74b to deflect outward unimpeded. When the area inside the annular ring 64 remains attached to the area outside the ring 66 at both unthinned sections 62a and 62b, the amount of clearance required for unimpeded opening of the vent is reduced, while providing a large opening area in the metal plate 14 to reduce the internal cell pressure quickly. If the annular ring 64 is interrupted in more than 2 places, less clearance may be required, but the area of the opening may also be less. FIG. 4 shows the vent open at both reduced thickness arcs. Generally the vent will open at only one arc—the weaker one. Therefore, the invention can provide redundant vents. If one arc is unable to operate as intended, the vent can open at the other arc to release pressure from the cell.

The cell 10 may have a positive terminal cover extending over the vent 40. This can provide protection for the vent, insure adequate clearance to the outside of the vent 40, and provide some containment for material released from inside the cell 10 when the vent 40 opens. The space between the metal plate 14 and the inside of the nubbin 44 of the positive terminal 42 allows the vent 40 to open outward without the terminal 42 interfering with the outward deflected portions 74*a* and 74*b*.

A positive terminal cover 42 may not be necessary, as long as there is sufficient clearance on the outside of vent 40 for proper vent operation. In such cells the area inside the annular ring 64 is retained by at least one of the unthinned sections 62*a* and 62*b*.

Figure 5:
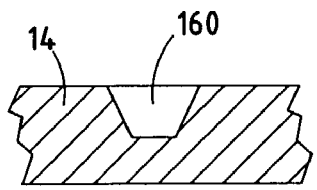
FIG. 5 is a partial sectional view of a reduced thickness groove in a container bottom.

The arcs 60*a* and 60*b* shown in FIG. 3 have a stylized shape with straight vertical walls, a flat horizontal bottom, and a sharp corner between the walls and bottom. In practice, it is difficult to make a groove with such a shape, even with tooling that has straight edges and sharp corners. The side walls and bottom tend not to be straight or flat, and corners within and at the edges of the groove tend to be somewhat rounded. The thinned grooves may have other cross-sectional shapes than that shown in FIG. 3. For example, they may have a U- or a V-shape, or a trapezoidal shape such as the groove 160 shown in FIG. 5.

While the embodiment shown in FIG. 2 has a pressure relief vent in the closed end of the cell, a pressure relief vent may be formed, in a similar fashion, in a metal plate in a closing element in the open end of the container. Providing a cover, such as the negative terminal cover in FIG. 1, over the vent-containing metal plate in the closing element can provide the same advantages as described above for the positive terminal cover when the vent is in the closed end of the container. However, the vent must be able to open sufficiently, without interference from the negative terminal cover to relieve internal cell pressure within the desired time. A pressure relief vent in the closing element may require an additional cell component compared to the cell in FIG. 1, but in some circumstances forming a vent in a separate metal plate may be easier than forming a vent in a metal plate that is an integral part of the can (e.g., if the can is particularly small in diameter).

The vent-containing metal plate in the cell shown in FIG. 1 is substantially flat. When the reduced thickness interrupted annular groove is incorporated into a raised or depressed annular ring (e.g., a ridge or a trough), the volume taken up by the metal plate and vent can be greater. In addition, when pressure builds up inside the cell, the metal plate may bulge outward to a greater extent before the vent opens, requiring more clearance to the outside of the vent. Therefore, when the annulus containing the interrupted thinned groove does not protrude from the surface of the metal plate, more space is generally available for active materials.

In the embodiments shown in FIGS. 1–4, the pressure relief vent has two reduced thickness arcs disposed on a single annular ring. Other embodiments are envisioned. For example, the vent may include additional reduced thickness grooves. Additional reduced thickness grooves may be disposed radially inside or outside the annular ring on which the reduced thickness arcs are disposed. They may be straight or curved grooves, intersecting or nonintersecting, though the tooling required to make vents with nonintersecting grooves tends to be simpler, easier to make, and easier to maintain. In another example, the vent-containing plate may have more than one annular ring, each of which comprises an interrupted reduced thickness groove with a different radius of curvature. Such a vent can be designed to open at different pressures. For instance, the grooves on an inner ring may be designed to open at a relatively low pressure and have a relatively small open area, while those on an outer ring may open at a higher internal pressure to create a larger open area.

In FIG. 2 each of the reduced thickness arcs has a single radius of curvature; in other words, the radius of curvature of the radial midpoint of the arc is constant at all points on the arc, and the radii of curvature of the arcs have a common locus (i.e., the radial midpoints of the arcs are all disposed on the same annulus). In another embodiment the arcs can be curved arc shapes that do not have single radii of curvature. In yet another the arc radii can be different from the radius of an annular ring on which the arcs lie; in such embodiments the arcs lie on a broader annulus than that in FIG. 2. Such a vent design may be particularly useful for another cell shape, such as an oval, rather than a circular, cylindrical shape, so the arc shapes could match the cross-sectional shape of the side wall of the cell container.

In general, it is desirable that vent designs require as little of the total cell volume as practical and not produce ejected parts when the vent opens. A simple design is usually better than a more complex design that has no additional advantages.

Pressure relief vents of the invention can be made using any suitable method or combination of methods for producing reduced thickness grooves in metal plates. Suitable methods include, but are not limited to, stamping, casting, forging, rolling, cutting, grinding, laser scribing, and chemical etching. Stamping methods, such as coining, are particularly well suited. When the vent is disposed in the bottom of a can, the can may be made by deep drawing or impact extrusion, and the vent may be formed in the can bottom, either as a separate process or as part of the can manufacturing process using either transfer or progressive die technology. In an example of a combined process, cans are deep drawn on a press using a progressive die. A strip of metal is fed into the die and is indexed through a series of punches and dies. Each punch and die draws the can deeper and/or forms the can closer to its final shape. One or more of the punch and die sets coins the reduced thickness grooves into the bottom of the can. This is generally done near the end of the process. In the last step, the formed cans, complete with pressure relief vents in their bottoms, are punched out of the strip of metal. The thickness of the can side wall and bottom can be controlled by a combination of selection of the characteristics and thickness of the metal strip and the amount and location of metal stretching (and thinning) during drawing (a result of the die design). One or more separate steps can also be used to flatten or otherwise shape the can bottom after forming the reduced thickness grooves, since coining the grooves tends to distort the can bottom shape. While this shaping may thin the can bottom, any such thinning is minimal, and the areas of the can bottom outside the thinned grooves are referred to herein as "unthinned". Combining the coining of the vent with the can drawing process makes the design of the tooling more complex, but it eliminates the need for a separate process, and it can reduce the total cost and variability in manufacturing.

As disclosed above, the reduced thickness grooves of the pressure relief vent can be formed by coining, either during the can/metal plate manufacturing process, or as a separate process. In coining, force is applied to the metal, located between a punch and a die. Either or both of the punch and die can include projections, which cause the metal to flow into the desired shape.

In designing a pressure relief vent, it is desirable to take into account manufacturing considerations, such as cost and ease of die design and fabrication, operating speeds of equipment, stresses on forming equipment, wear and maintenance of tooling (e.g., punches and dies), variability in manufactured articles, and tolerances of specified dimensions. It may be desirable to make compromises when some manufacturing considerations are in conflict with others. When coining processes are used, radially symmetrical vent designs contribute to minimizing stresses on the tooling. This tends to reduce the required frequency of maintenance of the tooling, the frequency of tooling replacement, and the variability in vent dimensions, thereby making a positive contribution to product cost, quality, and reliability. It is desirable, to the extent practical, to incorporate into the vent design shapes for which tooling is easy to fabricate, wear resistant, and easy to maintain. Therefore, simplicity of the vent design is generally desirable.

In addition to the above manufacturing considerations, the pressure relief vent design must be able to operate effectively to release excessive pressure from the cell in a controlled, safe manner. A good vent design will open at the desired pressure differential between the inside and outside of the cell and do so quickly enough and with a sufficiently large open area. Desirable characteristics can also include a minimum vent activation pressure that is well beyond the normal operating pressure of the cell, a maximum vent activation pressure that is well below the pressure at which an uncontrolled release would occur, and low variability in vent activation pressure. It can also be advantageous for the vent to open fully, to create the maximum opening area, in a very short time. It may also be desirable for the vent to operate in such a way as to minimize cell distortion (e.g., bulging of the can) before, during, and after opening.

Many factors can affect the vent activation pressure and the way in which the vent opens. These include, but are not limited to, metal type and characteristics (e.g., hardness, tensile stress, and elongation), unthinned thickness of the vent-containing plate, thickness of the vent-containing plate in the thinned grooves, cross-sectional shapes of the grooves, diameter of the vent-containing plate, planar shapes and dimensions of the grooves, locations of the grooves on the vent-containing plate, and widths of the unthinned sections interrupting the groove arcs.

Computer modeling software using finite element analysis, such as ABAQUS (from Hibbit, Karlsson & Sorensen, Inc., Pawtucket, R.I., USA) and MARC K 7.3 (from MSC-.Software, Los Angeles, Calif., USA), can be a useful tool for designing pressure relief vents; it can take such factors into account. For example, the can material and thickness may be selected based on other requirements, such as the cell electrochemistry, size, and method of closing and sealing. Those same factors are also important in determining the desired pressure at which the pressure relief vent should open. Finite element analysis can then be used to predict the vent activation pressure for a given vent design and to refine the design to meet the needs of a particular cell.

The embodiment of the electrochemical battery cell of the invention shown in FIG. 1 is a cylindrical alkaline Zn/MnO$_2$ cell with a container comprising a metal can with a closed bottom end and an open top end. A closing element is disposed in the open end of the can to seal the active materials and electrolyte in the cell. This embodiment is described in further detail below.

The can may be made of any suitable metal. A suitable metal is one that can be formed into the desired shape and can be adapted to seal the contents within the cell. It will be sufficiently stable, in contact with both the internal components of the cell and the intended external environment, to provide acceptable performance, even after storage for long periods of time. Since it also functions as the cathode current collector, the can will have good electrical conductivity.

Steel is typically used for alkaline Zn/MnO$_2$ cells. The external surface of the steel container may be plated to provide corrosion resistance, high electrical conductivity, and an attractive appearance. The internal surface of at least that portion of the side wall in contact with the cathode may be coated with a material, such as graphite, to provide good electrical contact between the can and the cathode. An example of a suitable material for alkaline Zn/MnO$_2$ cell cans is a low carbon, aluminum killed, SAE 1006 or equivalent steel substrate comprising maximums of 0.08 weight percent carbon, 0.45 weight percent manganese, 0.025 weight percent phosphorous and 0.02 weight percent sulfur. The grain size of the steel is ASTM 8 to 12. If the substrate is plated with nickel or nickel and cobalt, the material is annealed after electroplating to allow diffusion of iron from the substrate to the surface. The steel strip may have the following mechanical properties: 45,000 pound maximum yield strength; 60,000 pound ultimate strength; 25 percent minimum elongation in 2 inches (50.8 mm); and 82 maximum Rockwell 15T hardness.

To provide the maximum volume for active materials in the cell, the can will be as thin as possible, as long as it is strong enough to withstand the forces of cell manufacture, storage, and use. The can side walls and bottom are typically from about 0.005 inch (0.13 mm) to about 0.014 inch (0.36 mm) thick, usually no more than about 0.010 inch (0.25 mm). At less than 0.005 inch (0.13 mm), the can sides and/or bottom can bulge too much at acceptable internal cell pressures. This can cause problems getting batteries into and out of battery compartments. If the can is more than 0.014 inch (0.36 mm) thick, the volume of the cell available for active materials may be unnecessarily reduced. The can walls and bottom may be the same thickness or different thicknesses. The can side wall can have different thicknesses in different areas to achieve the strength where needed but minimize the amount and volume of material elsewhere.

The cathode is formed in the shape of a hollow circular cylinder against the inner surface of the can side wall. A common alkaline Zn/MnO$_2$ cell cathode comprises a mixture of MnO$_2$ active material and particles of graphite, which is used to increase the electrical conductivity of the electrode. The MnO$_2$ is often an electrolytic manganese dioxide (EMD). Suitable alkaline cell grade EMD can be obtained from Kerr-McGee Chemical Corp. (Oklahoma City, Okla., USA) and Erachem Comilog, Inc. (Baltimore, Md., USA). Preferably the EMD is a high-potential EMD (pH-voltage of at least 0.86 volt) with a potassium content less than 200 ppm, as disclosed in International Patent Publication No. WO 01/11703 A1, published 15 Feb. 2001. The graphite may be an alkaline grade graphite powder, an expanded graphite, or a mixture thereof. A suitable expanded graphite, according to International Patent Publication No. WO 99/00270, published 6 Jan. 1999, is available from Superior Graphite Co. (Chicago, Ill., USA). The mixture typically also comprises water (with or without electrolyte salt), and may also include small (typically less than 2 percent by weight) amounts of other materials, generally to improve performance in some way. Examples of such performance-enhancing materials include niobium-doped TiO$_2$, as disclosed in International Patent Application No. WO 00/79622 A1, and barium sulfate.

In some cells a binder is added to the cathode mixture to strengthen the cathode. The binder may also have some additional desirable properties. For example, the binder may function as a lubricant when the cathode is formed or may retain electrolyte in the cell, facilitating ion mobility during discharge. In general, a minimal amount of binder (or none) is used in order to maximize the amounts of active and electrically conductive materials. When a binder is used it generally comprises about 0.1 to 6, more typically 0.2 to 2, weight percent of the solid components of the positive electrode mixture. Suitable binders for alkaline $Zn/MnO_2$ cathodes include monomers and polymers of materials such as acrylic acid, acrylic acid salts, tetrafluoroethylene, calcium stearate, acrylic acid/sodium sulfonate copolymer, and copolymers of styrene and one or more of butadiene, isoprene, ethylene butylene, and ethylene propylene. Binder materials may be used alone or in combination. CARBOPOL® 940 (an acrylic acid in the 100% acid form from B. F. Goodrich), Coathylene HA 1681 (a polyethylene from Hoechst Celanese), KRATON® G1702 (a diblock copolymer of styrene, ethylene, and propylene from Kraton Polymers Business), poly (acrylic acid-co-sodium 4-styrene sulfonate) have been found to provide good electrode strength. Mixed binders, such as a mixture of CARBOPOL® 940 and either TEFLON® T30B or TEFLON® 6C (tetrafluoroethylenes from E. I. du Pont de Nemours & Co.), can be advantageous. When a mixture of these two materials is used, a CARBOPOL® to TEFLON® weight ratio of from 1:4 to 4:1 can be advantageous. In general, within this range, the higher the ratio, the stronger the cathode. For example, the cathode is stronger with a CARBOPOL® to TEFLON® weight ratio of 3:1 than with a ratio of 1:1 or 1:3. When a CARBOPOL®/TEFLON® mixture is used, the binder level in the cathode may be about 0.2 to 2, preferably 0.2 to 1, weight percent, based on the solid, undissolved components in the cathode mixture.

The amount of water in the mixture is generally from about 1.5 to 8.0 percent, based on the weight of the solid, undissolved ingredients in the cathode prior to molding. A typical range for use in making impact molded cathodes is 6 to 8 percent. A typical range for use in ring molding is 1.5 to 6 percent.

Two common methods of forming alkaline cell cathodes are ring molding and impact molding. In ring molding one or more (usually 3 to 5) rings are formed and then inserted into the can in a stack (one ring on top of another). Good physical and electrical contact between the can and the cathode are desirable. To achieve this the outside diameter of the rings may be made slightly larger than the inside diameter of the can to produce an interference fit, or the rings may be slightly smaller than the can to facilitate insertion, after which the rings are reformed slightly by applying force to the inside and/or top surface, thereby forcing cathode mixture firmly against the can. In impact molding the desired quantity of cathode mixture is put into the bottom of the can and molded to the desired dimensions using a ram that is inserted into the center of the can.

The percent solids packing of the molded cathode mixture, determined by dividing the sum of (weight/real density) of solid components by the actual volume of the formed cathode, is typically about 70 to 79 percent, with 72 percent being most typical in impact molded cathodes and 75–79 percent being most typical in ring molded cathodes.

A separator is inserted into the cavity formed in the cathode to separate the anode from both the cathode and the can bottom. The separator is typically one or two layers of a porous, wet-laid material of nonwoven synthetic fibers, such as 0.004 inch (0.10 mm) thick VLZ 105 grade separator from Nippon Kodoshi Corp. of Kochi-ken, Japan or 0.003 inch (0.08 mm) thick grade FS2100/063 separator from Freudenberg Vliesstoffe KG of Neuenburg, Germany. Each layer of separator can be folded and preformed into an elongated basket shape from a long strip of separator material. The separator covers the entire inside surface of the molded cathode and any exposed inside surface of the can bottom and extends upward beyond the top of the molded cathode, often high enough to contact the inside surface of the closing element when the cell is completed.

The anode mixture is typically a flowable gel that is dispensed into the cavity in the cathode and separator. The gel comprises a mixture of gelled zinc particles. The zinc may be in powder or flake form, or a combination of the two. An unamalgamated zinc alloy comprising bismuth, indium, and aluminum may be used. Zinc powder, preferably having a $d_{50}$ of about 110 µm, may be obtained from Umicore (Brussels, Belgium), and zinc flake (e.g., grade 5454.3) may be obtained from Transmet Corp. (Columbus, Ohio, USA). The anode also comprises water, potassium hydroxide electrolyte, and a gelling agent. Acrylic acid in the 100% acid form, such as CARBOPOL® 940 from B. F. Goodrich Specialty Chemicals (Cleveland, Ohio, USA) is a common gelling agent. Small amounts of other materials may also be added to the anode mixture and/or electrolyte to minimize gas generation in the cell and/or enhance discharge performance. Examples of such materials include $In(OH)_3$, ZnO, and sodium silicate.

The total KOH concentration in the electrolyte in the completed cell, including the anode, the cathode, and any additional electrolyte or water added to the cell, will generally be from about 36 to about 40 weight percent.

The relative amounts of cathode and anode in the cell are balanced so that if the cell were completely discharged there would be a small amount of one of the anode and cathode remaining. A slight excess of anode is often desirable. For example, the nominal ratio of anode to cathode, based on theoretical input capacities of each (assuming a 1.33 electron discharge of the $MnO_2$) may be between 0.90:1 and 0.99:1.

After the anode is dispensed into the cell, a closing element is inserted into the open end of the can. The closing element can include an anode current collector. The current collector extends through an opening in the seal to make contact with the negative terminal cover. The anode collector can be in the form of a nail or pin. The collector can be made of brass, coated with a high hydrogen overvoltage material, such as indium or tin. Indium may be applied to the collector by burnishing, as disclosed in U.S. Pat. No. 5,188,869. Alternatively, tin may be applied by plating.

The cell in FIG. 1 has a pressure relief vent formed in the can bottom to allow the use of a low volume closing element that does not include a pressure relief vent. Alternatively, because the pressure relief vent of the invention is a low volume vent, it can be formed in a metal plate that is part of a low volume closing element. The closing element in FIG. 1 has a metal cover, which also serves as the negative contact terminal of the cell, and an annular gasket between the cover and the can. The cover is electrically conductive and can be made of a metal, such as steel. The cover is often plated with nickel on the outer surface to make it corrosion resistant. The cover can also be coated on the inside surface to prevent gas-producing reactions if electrolyte and/or electrode materials come in contact with it. The gasket can be an elastomeric material capable of creating a compressive seal between the can and the cover. Suitable gasket materials include nylon, polyethylene, polypropylene, polytetrafluoroethylene, blends of polymers (e.g., polypropylene and an impact modified poly(phenylene oxide) such as NORYL® EXTEND™ PPX7110 and PPX7125, from General Electric Co. of Pittsfield, Mass., USA), and other polymeric materials with relatively low cold-flow rates under compression. A sealant may also be used at the interface between the gasket and can or between the gasket and cover. When the cell is closed, the diameter of the open end of the can is reduced and the top edge of the can is crimped over, pushing the closing element downward against the bead. Therefore, the can side wall has an annular bead just below the gasket to support the closing member.

Figure 6:
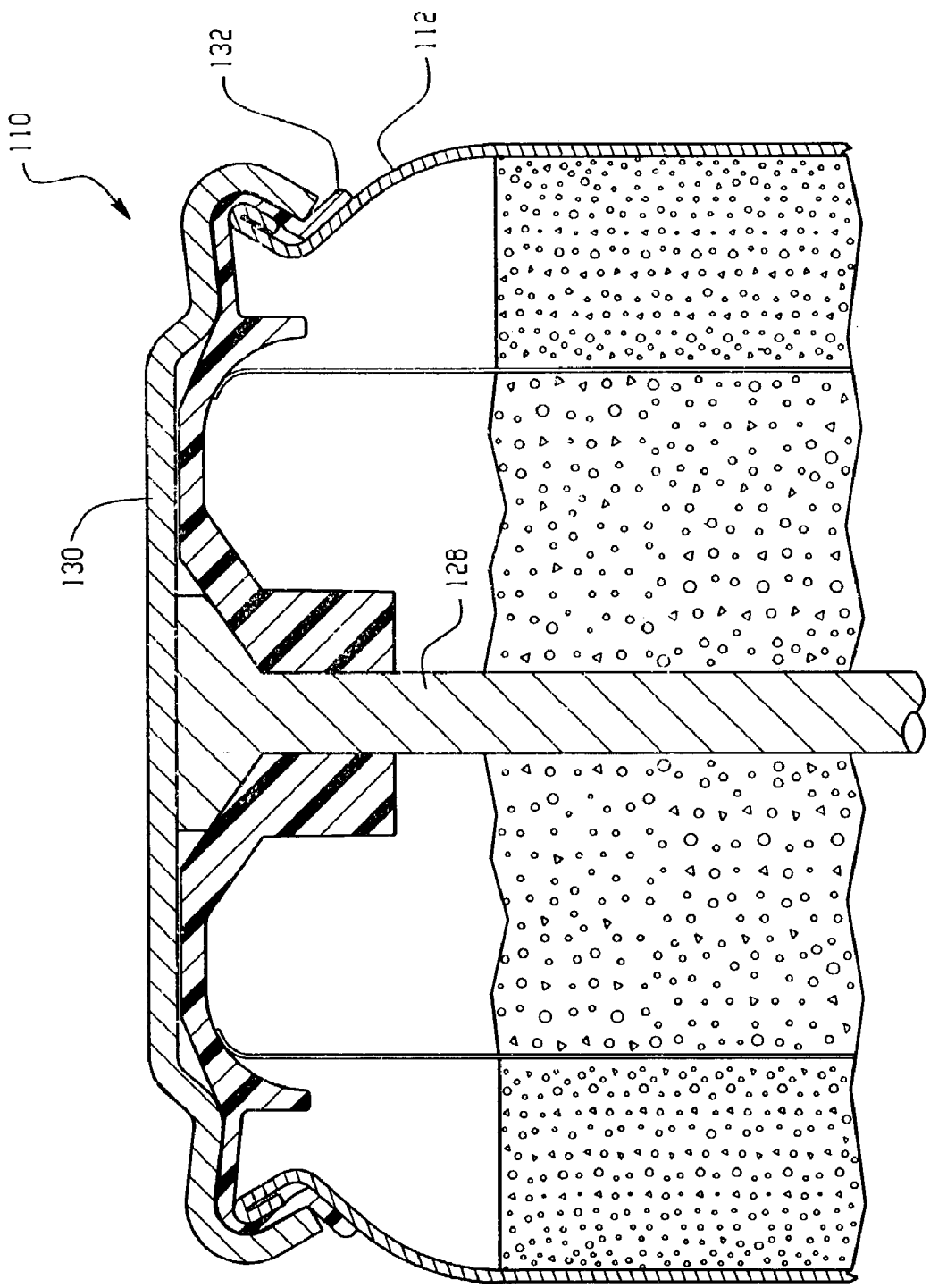
FIG. 6 is a partial sectional view showing a cross-section of a portion of a second embodiment of the battery cell of the invention.

Other closing element designs and cell closing processes may be used in cells of the invention. An example of a cell 110 in which the cover is crimped over the outside of the open top of the can is shown in FIG. 6. In this design, the top edge of the can 112 is curled outward for strength. The open end of the can, beneath the curled edge, is necked inward so the cover 130 does not extend radially outward farther than the outside diameter of the main body of the can. The anode current collector 128 is electrically connected to the center of the cover. The peripheral edge of the cover is crimped inward against the gasket so the cover is locked in place under the curled edge of the can. The gasket 132 not only forms a compressive seal between the cover and can, but it extends across the inside surface of the cover and forms a compressive seal around the current collector, protecting the cover from the cell contents. This design is low in volume and has the additional advantage that little or no axial loading is placed on the can during cell closing. This can eliminate the need for a bead in the can to support the closing member and make the use of a can with a thinner side wall possible. Other low volume designs may be used in cells of the invention. Examples include the designs disclosed in U.S. Pat. Nos. 6,410,186, 6,368,745, 6,312,850; 6,300,006, 6,300,004, 6,294,283, 6,287,350, 6,265,096, and 6,251,536, as well as co-pending U.S. patent application Ser. No. 10/034,687, which are hereby incorporated by reference.

Embodiments of the inventions are described in further detail in the following examples.

EXAMPLE 1

Cans suitable for use in LR6 type cells, were made with pressure relief vents in their bottom ends as follows.

Cans were deep drawn from an aluminum-killed, low carbon steel strip (carbon content of approximately 0.04%) having a nominal thickness of 0.010 inch (0.254 mm), a Vickers microhardness of approximately 120, and a grain size of ASTM 8 to 12. The strip was plated with nickel on the outside surface and nickel and cobalt on the inside surface and was diffusion annealed. The cans were manufactured on a U.S. Baird multiple transfer press.

A stamping die incorporating replaceable carbide inserts was used to fabricate the vent. A single coining step was used to form the reduced thickness grooves of pressure relief vents into the outside surfaces of the can bottoms. The raised portions of the carbide inserts that physically impact against can bottoms to form the grooves were polished to a surface finish of 2 microinches (0.051 μm) or less using a diamond paste polishing compound. This was followed by a can bottom flattening step, to insure a flat bottom. A water-based lubricant was used to cool and lubricate the steel and die during forming. The finished cans were cleaned by an alkaline cleaning solution to remove lubricant and other residue.

Nominal dimensions of the desired LR6 cans were those shown in Table 1.

TABLE 1

| Description | Dimension |
|---|---|
| Can height | 1.926 in. |
| | (48.92 mm) |
| Height to top of can step | 1.807 in. |
| (from bottom outside) | (45.90 mm) |
| Outside diameter of can | 0.568 in. |
| (above can step) | (14.43 mm) |
| Inside diameter of can body | 0.526 in. |
| (below can step) | (13.36 mm) |
| Can bottom corner radius of | 0.025 in. |
| curvature (outside surface) | (0.64 mm) |
| Can side wall thickness | 0.0103 in. |
| above step | (0.26 mm) |
| Can side wall thickness | 0.0098 in. |
| below step | (0.25 mm) |
| Can bottom thickness | 0.010 in. |
| (unthinned) | (0.25 mm) |

Figure 7:
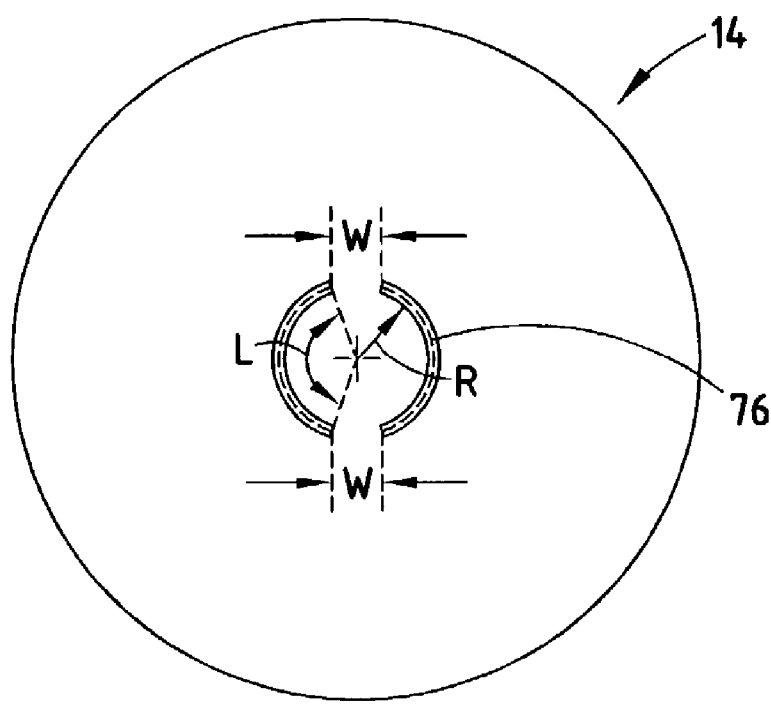
FIG. 7 is a plan view showing dimensions of the bottom of the container in FIG. 2.
Figure 8:
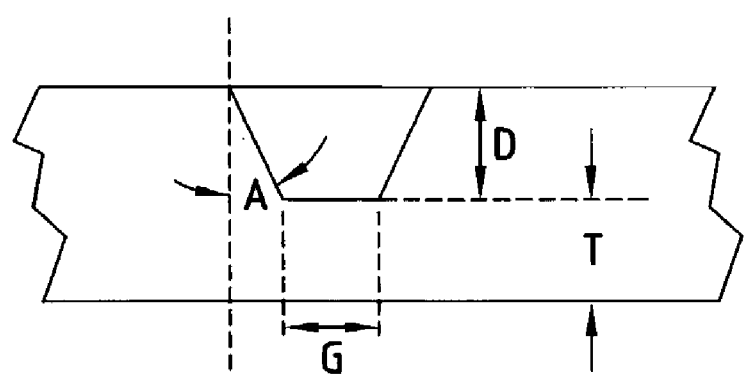
FIG. 8 is a partial sectional view showing dimensions of the reduced thickness groove and container bottom in FIG. 5.

The pressure relief vent design selected is shown in detail in FIGS. 7 and 8. Each of the reduced thickness arcs has a single radius of curvature equal to the radius of curvature of the annular ring. The maximum internal pressure at which the pressure relief vent would open in completed cells, including terminal covers and jackets, was set at 1650 pounds per square inch (psi) (116.0 kg/cm$^2$). The minimum cell vent pressure was set at 1050 psi (73.8 kg/cm$^2$). These limits for individual LR6 cells corresponded to can vent pressures of 800 to 1400 psi (56.2 to 98.4 kg/cm$^2$). Using finite element analysis, the desired nominal dimensions of the pressure relief vent were selected to be those in Table 2 to produce a can with an average vent pressure between 1000 and 1150 psi (between 70.3 and 80.8 kg/cm$^2$). The shape of the groove was selected to facilitate manufacturing. Tooling was easily maintained with the wall angle and the width at the bottom of the groove shown. The tooling was initially set for a groove thickness of approximately 0.003 inch (0.076 mm) and then adjusted until the desired average vent pressure was obtained. Adjusting the groove thickness can also be a convenient means of maintaining the desired vent pressure during the manufacturing process. It may be desirable to set a minimum groove thickness limit; 0.002 inch (0.051 mm) was selected as the minimum thickness in this example. The width of the unthinned sections between the ends of the reduced thickness arcs was selected to be 0.060 inch (1.52 mm) to insure that the area of the can bottom within the annular ring would remain attached to the area radially outside the annular ring when the vent opened.

TABLE 2

| FIG. 7 & 8 Ref. | Description | Dimension |
|---|---|---|
| R | Radius of curvature of annular ring (from longitudinal axis of can to radial midpoint of ring) | 0.100 in. (2.54 mm) |
| W | Width of unthinned section between reduced thickness arcs (between radial midpoints of arcs) | 0.060 in. (1.52 mm) |
| D | Depth of groove | 0.007 in. (0.18 mm) |
| T | Groove thickness | 0.003 in. (0.076 mm) |
| G | Width of groove at bottom | 0.004 in. (0.10 mm) |
| A | Angle of groove wall (from vertical) | 30 deg. |
| L | Arc length of reduce thickness arc (each arc) | 145 deg. |

FIGS. 7 and 8 are stylized drawings, showing grooves with regular, flat surfaces and sharp angles. Actual formed pressure relief vents will have grooves with surfaces that are somewhat irregular. In measuring dimensions on actual formed vents, averaging can be used to compensate for irregularities. Potting and cross sectioning can be used to prepare cans for measurement of the pressure relief vent dimensions. Other methods can also be used to produce comparable results. Nondestructive measurements of the groove depth can be made using an instrument such as a SmartScope Model ZIP 250 (Optical Gaging Products, Inc., Rochester, N.Y., USA). The thickness of the can at the bottom of the groove (groove thickness) can be calculated by subtracting this groove depth measurement from the unthinned bottom thickness, which can be measured with a micrometer gauge.

EXAMPLE 2

Cans from Example 1 were tested to evaluate the pressure at which the pressure relief vents would open. Because cans are more easily tested when they are empty than after they have been used in cells, a correlation was first established between the results of cell and can vent pressure. Live cells were tested hydraulically for both convenience and to closely approximate the way in which pressure builds up in cells. Empty cans were tested using a pneumatic tester as a matter of convenience.

Pneumatic testing of empty cans was done using a Fastest Pneumatic Can Vent Tester, Model FES0-04, available from Fastest Corporation, St. Paul, Minn., USA. Each can was tested by placing it into a test fixture, sealing the open end of the can against the fixture, and pressurizing the inside of the can at a selected rate of about 50 lbs./sec. (3.5 kg/sec.) until the pressure relief vent opened. The rate of pressurization was controlled by adjusting a needle valve on the pressure inlet so that the time interval between pressure readings of 300 and 800 psi (21.1 and 56.2 $kg/cm^2$) was 10 seconds. The pressure within the can was monitored with an electronic gauge meter with a peak hold feature. The vent pressure of a can was the peak pressure reading from this gauge after the vent had opened. The can was also observed to determine if the area inside the vent remained connected to the area outside the vent, and if so, whether at one or both of the unthinned sections between the reduced thickness arcs of the vent. The test fixture was designed specifically for this testing. The test fixture design can affect the test results, so the correlation between cell and can vent pressures will depend on the test fixtures used.

The vent pressures of cans from Example 1 averaged 1090 psi (76.6 $kg/cm^2$), with a standard deviation of 72 psi (5.1 $kg/cm^2$). When the cans vented, no ejection of any portion of the can bottom occurred; the section of the can bottom inside the annular ring remained attached to the can in all cases. In contrast, when similar cans with only a 0.050 inch (1.27 mm) unthinned section between the ends of the arcs were tested, both unthinned sections sometimes broke, and the portion of the can bottom within the annular ring was ejected from about 20 percent of the cans.

During manufacture of 2,000,000 LR6 cans in Example 1, the groove thickness was checked frequently and can vent pressure was tested periodically. No significant differences attributable to tooling wear were observed in groove thickness or can vent pressure over the entire period of manufacture. Maintenance of the tooling used to coin the pressure relief vent grooves was not required any more frequently than for the normal tooling used in forming cans without pressure relief vent grooves.

EXAMPLE 3

Cans suitable for use in LR03 type cells were made with the nominal dimensions shown in Table 3. The can manufacturing process was as described in Example 1, using 0.010 inch (0.25 mm) thick steel strip.

TABLE 3

| Description | Dimension |
|---|---|
| Can height | 1.689 in. |
| | (42.90 mm) |
| Height to top of can step | 1.569 in. |
| (from bottom outside) | (39.86 mm) |
| Outside diameter of can | 0.4115 in. |
| (above can step) | (10.45 mm) |
| Inside diameter of can body | 0.380 in. |
| (below can step) | (9.66 mm) |
| Can bottom corner radius of | 0.020 in. |
| curvature (outside surface) | (0.51 mm) |
| Can side wall thickness | 0.010 in. |
| above step | (0.25 mm) |
| Can side wall thickness | 0.008 in. |
| below step | (0.21 mm) |
| Can bottom thickness | 0.0090–0.0105 in. |
| (unthinned) | (0.23–0.27 mm) |

The selected pressure relief vent design was that shown in FIGS. 7 and 8, with the nominal dimensions shown in Table 4. The shape of the groove (depth, wall angle, and width at the bottom) and the width of the unthinned sections between the ends of the arcs were kept the same as in Example 1. The radius of curvature of the annular ring was reduced to produce a desired nominal can vent pressure of 1800 psi (126.5 $kg/cm^2$).

TABLE 4

| FIGS. 7 & 8 Ref. | Description | Dimension |
|---|---|---|
| R | Radius of curvature of annular ring (from longitudinal axis of can to radial midpoint of ring) | 0.070 in. (1.78 mm) |
| W | Width of unthinned section between reduced thickness arcs (between radial midpoints of arcs) | 0.060 in. (1.52 mm) |
| D | Depth of groove | 0.007 in. (0.18 mm) |
| T | Groove thickness | 0.003 in. (0.076 mm) |
| G | Width of groove at bottom | 0.004 in. (0.10 mm) |
| A | Angle of groove wall (from vertical) | 30 deg. |
| L | Arc length of reduce thickness arc (each arc) | 160 deg. |

EXAMPLE 4

Vent pressures of cans from Example 3 were determined in the same manner as in Example 2. The actual can vent pressure averaged 1848 psi (129.9 $kg/cm^2$), with a standard deviation of 79 psi (5.6 $kg/cm^2$).

EXAMPLE 5

A pressure relief vent was designed according to FIG. 7 for LR6 cell cans made from 0.008 inch (0.20 mm) thick steel strip. A nominal can vent pressure of 800 to 900 psi (56.2 to 63.3 kg/cm$^2$) was selected. The nominal can dimensions are shown in Table 5, and the nominal vent dimensions are shown in Table 6. Because the cans were made for use in cells with a different closing element design than the cans in Example 1, the outside diameter of the top portion of the can is different. Reducing the can bottom thickness from 0.010 inch (0.25 mm), as in Example 1, also reduced the can vent pressure, because the required vent pressure will also be lower, so the same vent dimensions as used in Example 1 could be used in Example 5.

TABLE 5

| Description | Dimension |
| --- | --- |
| Can height | 1.924 in. |
|  | (48.86 mm) |
| Height to top of can step | 1.766 in. |
| (from bottom outside) | (44.86 mm) |
| Outside diameter of can | 0.582 in. |
| (above can step) | (14.78 mm) |
| Inside diameter of can body | 0.530 in. |
| (below can step) | (13.46 mm) |
| Can bottom corner radius of | 0.025 in. |
| curvature (outside surface) | (0.64 mm) |
| Can side wall thickness | 0.008 in. |
| above step | (0.20 mm) |
| Can side wall thickness | 0.008 in. |
| below step | (0.20 mm) |
| Can bottom thickness | 0.007–0.009 in. |
| (unthinned) | (0.18–0.23 mm) |

TABLE 6

| FIGS. 7 & 8 Ref. | Description | Dimension |
| --- | --- | --- |
| R | Radius of curvature of annular ring (from longitudinal axis of can to radial midpoint of ring) | 0.100 in. (2.54 mm) |
| W | Width of unthinned section between reduced thickness arcs (between radial midpoints of arcs) | 0.060 in. (1.52 mm) |
| D | Depth of groove | 0.007 in. (0.18 mm) |
| T | Groove thickness | 0.003 in. (0.076 mm) |
| G | Width of groove at bottom | 0.004 in. (0.10 mm) |
| A | Angle of groove wall (from vertical) | 30 deg. |
| L | Arc length of reduce thickness arc (each arc) | 145 deg. |

EXAMPLE 6

Cans from Example 5 were vent tested as in Example 2. The vent pressures averaged 865 psi (60.8 kg/cm$^2$), with a standard deviation of 31.3 psi (2.2 kg/cm$^2$). When the cans vented, no ejection of any portion of the can bottom occurred; the section of the can bottom inside the annular ring remained attached to the can in all cases.

EXAMPLE 7

A pressure relief vent was designed for cans to be used in a LR20 type cell. Nominal can dimensions are shown in Table 7, and nominal pressure relief vent dimensions are shown in Table 8. The shape of the groove (depth, wall angle, and width at the bottom) and the width of the unthinned sections between the ends of the arcs were kept the same as in Example 1. The radius of curvature of the annular ring was increased to produce a desired nominal can vent pressure of 475 psi (33.4 kg/cm$^2$).

TABLE 7

| Description | Dimension |
| --- | --- |
| Can height | 2.346 in. |
|  | (59.59 mm) |
| Height to midpoint of can | 2.088 in. |
| step (from bottom outside) | (53.04 mm) |
| Outside diameter of can | 1.319 in. |
| (above can step) | (33.50 mm) |
| Inside diameter of can body | 1.277 in. |
| (below can step) | (32.44 mm) |
| Can bottom corner radius of | 0.038 in. |
| curvature (outside surface) | (0.97 mm) |
| Can side wall thickness | 0.0110–0.0125 in. |
| above step | (0.28–0.32 mm) |
| Can side wall thickness | 0.0090–0.0110 in. |
| below step | (0.23–0.28 mm) |
| Can bottom thickness | 0.0095–0.0105 in. |
| (unthinned) | (0.24–0.27 mm) |

The selected pressure relief vent design was that shown in FIG. 7, with the nominal dimensions shown in Table 8.

TABLE 8

| FIGS. 7 & 8 Ref. | Description | Dimension |
| --- | --- | --- |
| R | Radius of curvature of annular ring (from longitudinal axis of can to radial midpoint of ring) | 0.1745 in. (4.43 mm) |
| W | Width of unthinned section between reduced thickness arcs (between radial midpoints of arcs) | 0.060 in. (1.52 mm) |
| D | Depth of groove | 0.007 in. (0.18 mm) |
| T | Groove thickness | 0.003 in. (0.076 mm) |
| G | Width of groove at bottom | 0.004 in. (0.10 mm) |
| A | Angle of groove wall (from vertical) | 30 deg. |
| L | Arc length of reduce thickness arc (each arc) | 160 deg. |

Though the actual average can vent pressures were not exactly at the preselected nominal values in Examples 2, 4, and 6, they were within about 10%, showing that finite element analysis is a useful tool for pressure relief vent design. If necessary, adjustments to the actual average vent pressures can be made by changing the radius of curvature of the reduced thickness grooves. Alternatively, vent pressures can be adjusted by changing one or more other vent design parameters, such as the width of the unthinned section between the ends of the reduced thickness arcs, the width at the bottom of the groove, and the groove thickness.

From the dimensions of the pressure relief vents in Examples 1, 3, and 7, and the results of the testing in Examples 2 and 4, it is clear that, when the can bottom thickness is not changed, the same vent design can be readily adapted to cells of different sizes. This can be done by changing the radius of curvature of the annular ring on which the reduced thickness arcs are placed, interpolating or extrapolating from a plot of the annular ring radius of curvature as a function of can diameter. Minor changes can then be made empirically to adjust the average can vent pressure to the desired nominal.

As demonstrated above, the invention is useful in cells of various sizes, such as cells with container outside diameters from about 0.4 inch (10 mm) to about 1.4 inch (36 mm), and with pressure relief vents having an interrupted annular ring (groove) radius of curvature about 0.06 inch (1.5 mm) to about 0.18 inch (4.6 mm). For LR6 type cells, an annular ring radius of curvature of 0.100 inch (2.54 mm) has been demonstrated, but other radii of curvature, e.g., from about 0.085 inch (2.16 mm) to about 0.115 inch (2.92 mm), and beyond, can be expected to be suitable, by adjusting other vent design dimensions.

Although the present invention has been described in considerable detail, with reference to certain preferred versions thereof, other versions are possible. Therefore, the spirit and scope of the appended claims should not be limited to the description of the preferred versions contained herein.

The invention claimed is:

1. An electrochemical battery cell comprising:
a positive electrode, a negative electrode and an electrolyte;
a container comprising a side wall, an open end and a closed end, the closed end comprising a first metal plate that is an integral part of the container, wherein the positive electrode is formed in the shape of a cylinder located adjacent to the side wall of the container and the negative electrode is disposed in a cavity within the positive electrode;
a closing element, comprising at least one member selected from the group consisting of a second metal plate and a seal, disposed in and closing the open end of the container; and
a pressure relief vent, comprising at least one interrupted annular reduced thickness groove, formed in a vent-containing metal plate; wherein:
the reduced thickness groove is formed in the shape of an interrupted circle interrupted in at least two places, each by an unthinned section of the vent-containing metal plate, to form at least two reduced thickness arcs, wherein each of the arcs has a single radius of curvature and the arcs are located such that all of their radii of curvature have a common locus, and wherein the interrupted annular reduced thickness groove is centered in the vent-containing metal plate and the reduced thickness groove is formed closer to a center than a periphery of the vent-containing metal plate;
the vent is capable of opening at the groove, when an internal cell pressure exceeds a predetermined difference above an external pressure, such that an area of the vent-containing plate radially inside the groove remains attached to an area of the vent-containing plate radially outside the groove by one or more of the unthinned sections interrupting the groove; and
the vent-containing metal plate is the first metal plate, and wherein there are no reduced thickness grooves inside the at least one interrupted annular reduced thickness groove.

2. The cell defined in claim 1, wherein the area of the vent-containing plate radially inside the groove remains attached to the area outside the groove by all of the unthinned sections.

3. The cell defined in claim 1, wherein no surface of the vent-containing plate within the annular groove protrudes beyond adjacent surfaces of the vent-containing plate.

4. The cell defined in claim 1, wherein the pressure relief vent consists essentially of the at least one interrupted annular reduced thickness groove.

5. The cell defined in claim 1, wherein all vent grooves are free of intersecting reduced thickness grooves.

6. The cell defined in claim 4, wherein all of the arcs of the at least one annular groove have equal radii of curvature.

7. The cell defined in claim 1, wherein the pressure relief vent is disposed with radial symmetry on the vent-containing plate.

8. An electrochemical battery cell comprising:
a positive electrode, a negative electrode, and electrolyte comprising an alkaline aqueous solution;
a container comprising a side wall, an open end and a closed end, the closed end comprising a first metal plate that is an integral part of the container;
a closing element, comprising at least one member selected from the group consisting of a second metal plate and a seal, disposed in and closing the open end of the container; and
a pressure relief vent, comprising an annular ring, the ring comprising an interrupted reduced thickness groove, formed in the first metal plate; wherein:
the positive electrode is disposed adjacent to the side wall of the container, and the negative electrode is disposed in a cavity within the positive electrode, wherein the positive electrode has an inside diameter;
the reduced thickness groove is formed in the shape of an interrupted circle interrupted in at least two places, each by an unthinned section of the first metal plate, to form at least two reduced thickness arcs, wherein each of the arcs has a single radius of curvature and the arcs are located such that all of their radii of curvature have a common locus, wherein the reduced thickness groove is centered in the first metal plate and is closer to a center than a periphery of the first metal plate, and the reduced thickness groove has a diameter less than the inside diameter of the positive electrode; and
the vent is capable of opening, when an internal cell pressure exceeds a predetermined difference above an external pressure, at one or more of the arcs such that an area of the first metal plate radially inside the groove remains attached to an area of the first metal plate radially outside the groove by one or more of the unthinned sections interrupting the groove, wherein all vent grooves are free of intersecting reduced thickness grooves.

9. The cell defined in claim 8, wherein the cell comprises a jacket around the side wall of the container.

10. The cell defined in claim 8, wherein a contact terminal is disposed over the first metal plate and extends over the pressure relief vent.

11. The cell defined in claim 8, wherein the container is cylindrical, and wherein the vent consists essentially of the interrupted reduced thickness groove.

12. The cell defined in claim 11, wherein:
the container is made from aluminum-killed, SAB 1006, diffusion annealed, nickel-plated steel containing no more than 0.08 weight percent carbon, 0.45 weight percent manganese, 0.025 weight percent phosphorous and 0.02 weight percent sulfur;
the container has an outside diameter between 0.4 and 1.4 inch; and an unthinned thickness of the first metal plate is between 0.005 and 0.014 inch, inclusive.

13. The cell defined in claim 12, wherein each unthinned section forms an interruption in the reduced thickness groove that is at least 0.060 inch wide between adjacent arcs.

14. The cell defined in claim 13, wherein all arcs are defined by a single radius of curvature of 0.06 to 0.18 inch, inclusive.

15. The cell defined in claim 13, wherein the cell is an LR6 cell, the arc radius of curvature is 0.085 to 0.115 inch, inclusive, the unthinned thickness of the first metal plate is from 0.005 to 0.010 inch, inclusive, and each reduced thickness groove has a thickness not less than 0.002 inch.

16. The cell defined in claim 12, wherein each reduced thickness groove has a thickness not less than 0.002 inch.

17. The cell defined in claim 12, wherein each reduced thickness groove has a trapezoidal cross-sectional shape.

18. The cell defined in claim 8, wherein:
the closing element further comprises a metal cover with a peripheral edge;
the peripheral edge of the metal cover is bent over the open end of the container to compress the seal between an inner surface of the metal cover and an outer surface of the side wall of the container; and
the peripheral edge of the metal cover is disposed closer to a longitudinal axis of the cell than is a portion of the outer surface of the side wall of the container in contact with the seal.

19. A metal can for use as an electrochemical battery cell container, the can comprising a side wall, an open end, and a closed end, the closed end comprising an integral vent-containing metal plate, wherein:
the vent-containing metal plate comprises a first surface, a second surface, and an interrupted annular reduced thickness groove formed in at least one of the first and second surfaces;
the reduced thickness groove is formed in the shape of an interrupted circle interrupted in at least two places, each by an unthinned section of the vent-containing metal plate, to form at least two reduced thickness arcs, wherein each of the arcs has a single radius of curvature and the arcs are located such that all of their radii of curvature have a common locus, and wherein the interrupted annular reduced thickness groove is centered in the vent-containing metal plate and the reduced thickness groove is formed closer to a center than a periphery of the vent-containing metal plate; and
the plate is capable of opening at one or more of the arcs, when exposed to a pressure differential between the first and second surfaces above a predetermined level, such that an area of the plate radially inside the groove remains attached to an area of the plate radially outside the groove by one or more of the unthinned sections interrupting the groove, wherein a pressure relief vent consists essentially of the two reduced thickness arcs.

20. The can defined in claim 19, wherein the area radially inside the groove remains attached to the area radially outside the groove by all of the unthinned sections interrupting the groove.

21. The can defined in claim 19, wherein no surface of the first metal plate within the annular groove protrudes beyond adjacent surfaces of the first metal plate outside the annular groove.

22. The can defined in claim 19, wherein the can has a cylindrical shape.

23. The can defined in claim 19, wherein any reduced thickness grooves on the metal end plate are disposed with radial symmetry.

24. The can defined in claim 19, wherein all arcs have the same radii of curvature.

25. The can defined in claim 19, wherein the arcs are mutually nonintersecting.

26. The can defined in claim 25, wherein all vent grooves are free of intersecting reduced thickness grooves.

27. The can defined in claim 19, wherein the can is made from aluminum-killed, SAE 1006, diffusion annealed, nickel-plated steel containing no more than 0.08 weight percent carbon, 0.45 weight percent manganese, 0.025 weight percent phosphorous and 0.02 weight percent sulfur; and an unthinned thickness of the metal plate is 0.005 to 0.014 inch thick.

28. The can defined in claim 27, wherein the can has an outside diameter of 0.4 to 1.4 inch, and the annular groove has a radius of curvature from 0.06 to 0.18 inch, inclusive.

29. The can defined in claim 28, wherein the can has an outside diameter of 0.4 to 0.6 inch, and the annular groove has a radius of curvature from 0.085 to 0.115 inch.

30. The can defined in claim 29, wherein each unthinned section forms an interruption in the reduced thickness groove that is at least 0.060 in wide between adjacent arcs.

31. The cell defined in claim 8, wherein the positive electrode comprises manganese dioxide and the negative electrode comprises zinc.

32. The cell defined in claim 1, wherein the positive electrode has an inside diameter that is greater than a diameter of the reduced thickness groove.

33. The cell defined in claim 32, wherein the positive electrode comprises a molded cathode and the negative electrode comprises a gel anode.

34. The cell defined in claim 8, wherein the positive electrode comprises a molded cathode and the negative electrode comprises a gel anode.

35. The cell defined in claim 1, wherein the pressure relief vent consists essentially of a single interrupted annular recessed thickness groove.

* * * * *